Oct. 27, 1936.   G. A. MITCHELL   2,058,813
OPERATING MEANS FOR FOUR-WAY VIEW FINDER MATS
Filed Oct. 16, 1933   3 Sheets-Sheet 1
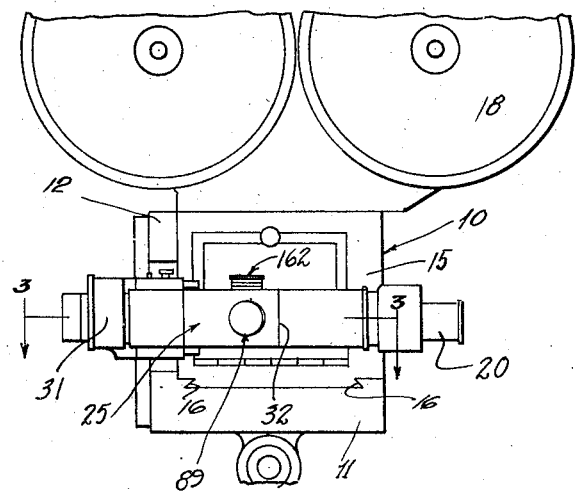
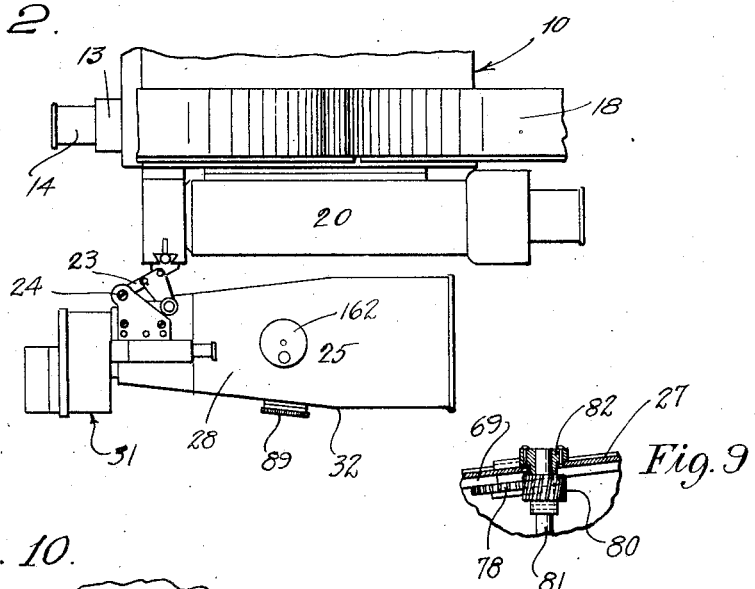
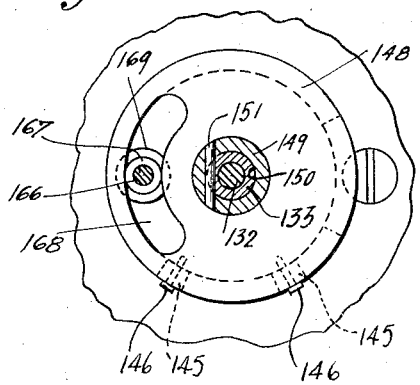
Inventor.
George A. Mitchell.
Attorney.

Oct. 27, 1936.   G. A. MITCHELL   2,058,813
OPERATING MEANS FOR FOUR-WAY VIEW FINDER MATS
Filed Oct. 16, 1933   3 Sheets-Sheet 2
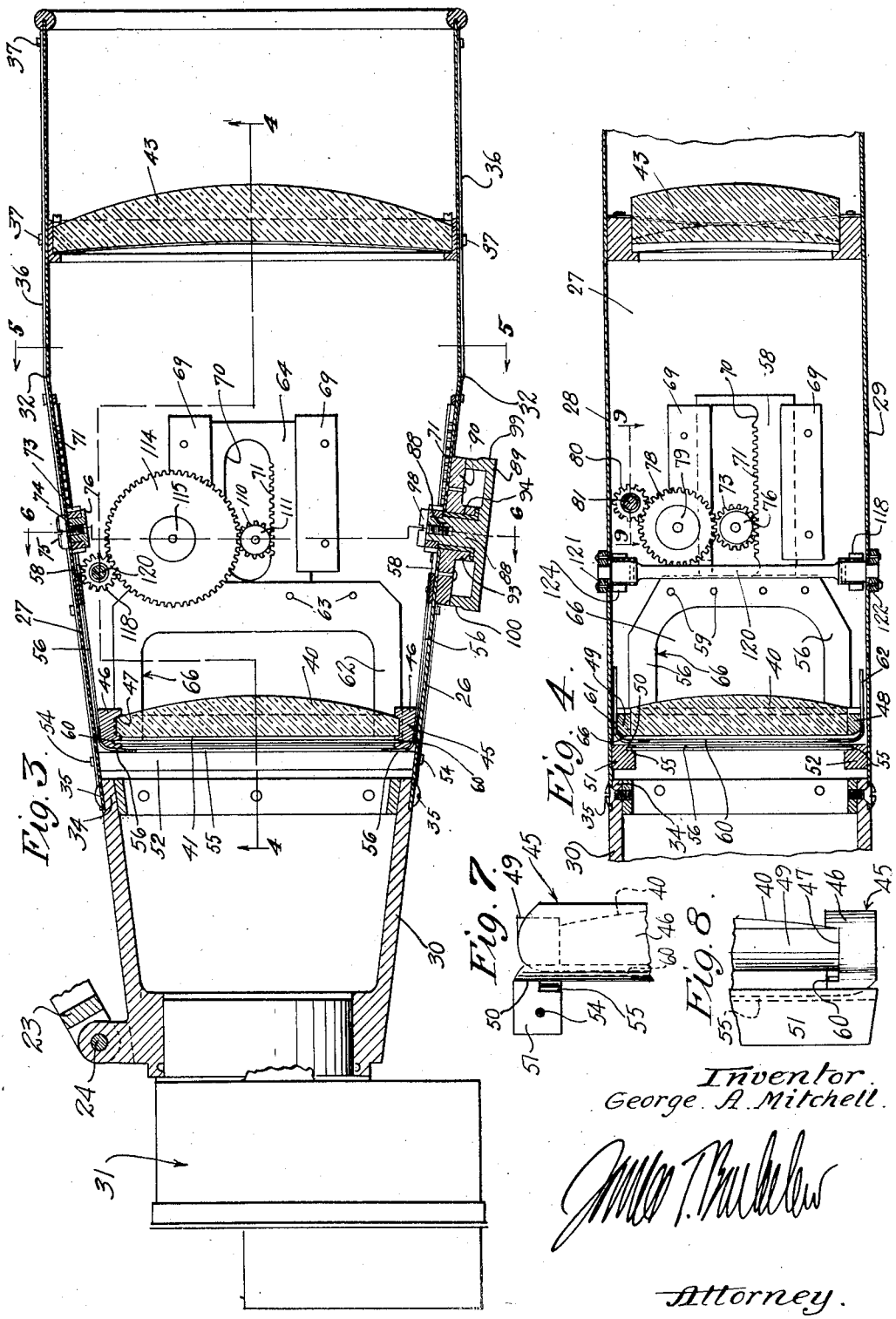
Inventor
George A. Mitchell
Attorney.

Oct. 27, 1936.  G. A. MITCHELL  2,058,813
OPERATING MEANS FOR FOUR-WAY VIEW FINDER MATS
Filed Oct. 16, 1933  3 Sheets-Sheet 3

Inventor.
George A. Mitchell.

Attorney.

Patented Oct. 27, 1936

2,058,813

UNITED STATES PATENT OFFICE

2,058,813

OPERATING MEANS FOR FOUR-WAY VIEW FINDER MATS

George A. Mitchell, Beverly Hills, Calif., assignor to Mitchell Camera Corporation, West Hollywood, Calif., a corporation of Delaware Application October 16, 1933, Serial No. 693,739

15 Claims. (Cl. 88—1.5)

This invention relates generally to focusing or view finding instruments having adjustable matting devices as used in motion picture cameras. The present invention is particularly adapted to and designed for use in the usual view finder used in connection with motion picture cameras, and may be considered in one aspect as an improvement on a motion picture view finder matting device disclosed in Patent No. 1,921,191, issued to Jonson and Grebe on August 8, 1933, Ser. No. 543,120. In its broader aspects, however, the present invention is not limited to any particular type of matting arrangement.

Motion picture cameras are ordinarily adapted to use with a number of photographic objectives of various focal lengths, and since the field of view taken in by a lens depends upon its focal length, the field of view spread upon the film (or ground glass of the focusing instrument) varies with the focal length of the camera objective in use. Since it is desirable that the field of view framed within the view finder instrument corresponds to the field of view spread on the film by the photographic lens, it accordingly becomes necessary to change the field of view within the view finder with each lens change in the camera.

The Jonson and Grebe patent referred to above disclosed a novel four-way adjustable mat arrangement within the view finder, adapted to be operated to vary the field of view framed within the view finder to bring it into correspondence with that spread on the film by the particular lens then in the camera. The view finder to which said invention particularly appertained comprised an elongated casing forming a light conduit, and having an objective at its forward end and a ground glass to the rear thereof on which the image was formed, the casing being of a cross sectional size but slightly larger than the largest image area to be framed and viewed on the ground glass. Jonson and Grebe provided four-way mats which moved in suitable guides transversely across the instrument in front of the ground glass to form an adjustable rectangular aperture, and the mats were formed of flexible material and were flexed and turned rearwardly at right angles and guided along the inner surface of the walls of the instrument casing. Attached to the rear turned end of each mat was a slide plate by which the mat was moved along the casing wall and through its right angle bend to move transversely across the casing. The slide plates were each formed with rack teeth meshing with a gear mounted on the instrument and operated by an adjustment knob. There was thus one knob for each of the four mats, and four individual adjustments were accordingly required to frame the view in the finder.

It is a primary object of the present invention to provide a view finding instrument having a four-way matting arrangement of the general type described, with means interconnecting opposing mats to operate toward and from each other in unison whereby each pair of opposing mats may be controlled by a single operating means.

Certain substantial difficulties are encountered in inter-connecting opposing mats to operate in unison with the type of instrument referred to, due to the fact that the view finding casing is just slightly larger in cross sectional area than the largest image to be framed on the ground glass, and the interconnecting means must be so arranged as not to interfere with the image on the ground glass. The manner by which I have overcome these difficulties is a feature of the invention, but this will be left to be explained in more detail in the body of the specification.

It is a further object of the invention to provide the mat operating members with suitable calibrated scales, whereby the mats may be set merely by reference to these scales, in contradistinction to past practice wherein individual mats were lined up by reference to the view area as observed through the focusing instrument of the camera.

The invention itself, as well as additional objects and features, will now be best understood by referring to the following detailed description of a present preferred embodiment thereof, reference for this purpose being had to the drawings, in which:

Fig. 1 is a side elevation of a conventional motion picture camera provided with a view finder;

Fig. 2 is a plan view looking down on the view finder shown on the camera of Fig. 1;

Fig. 3 is a horizontal longitudinal section taken through the view finder as indicated by line 3—3 of Fig. 1, the objective combination not being shown in section;

Fig. 4 is a section taken as indicated by broken line 4—4 of Fig. 3;

Fig. 7 is a side elevation detail of the mat framing device;

Fig. 8 is a detail looking down on the device shown in Fig. 7;

Fig. 9 is a detail taken on line 9—9 of Fig. 4; and

Fig. 10 is a section taken on line 10—10 of Fig. 6.

Figure 5:
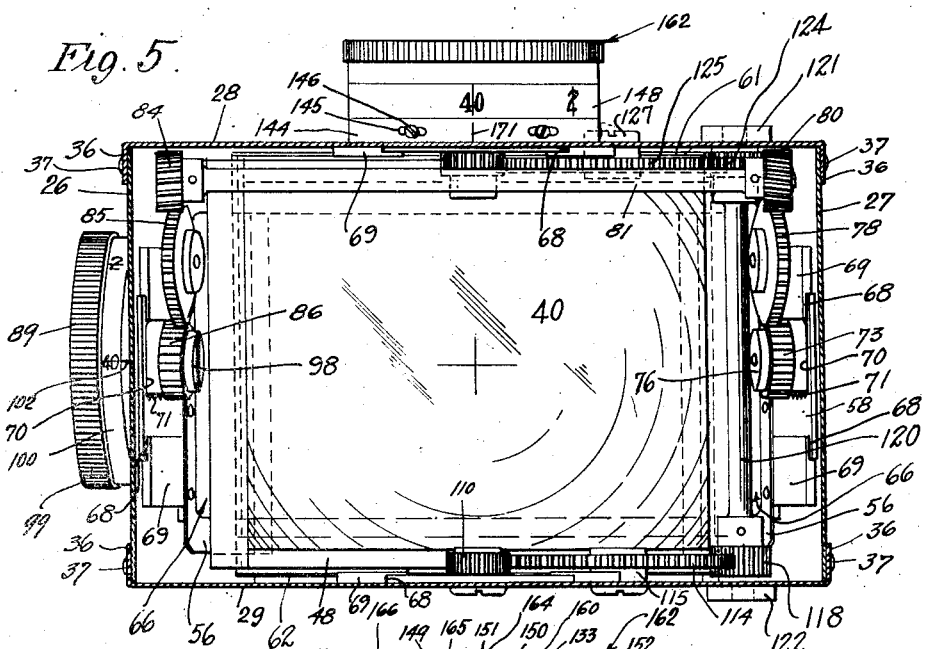
Fig. 5 is a transverse section taken as indicated by line 5—5 of Fig. 3.

In the drawings there is shown at 10 a conventional motion picture camera comprising base 11, head 12 rising from the front end of said base and carrying lens mount 13 supporting photographic objective 14, camera box 15 supported on base 11 to the rear of head 12 and transversely slidable in ways 16, and film magazine 18 mounted on box 15. Within box 15 is the usual exposure aperture plate and intermittent mechanism for moving the film past the plate, these parts not being illustrated since they may be of any conventional design. Before photographing a scene, an objective lens 14 of proper focal length is placed in mounting 13. Box 15 is then moved transversely in ways 16 to bring a focusing device 20, carried by the side wall of the box, into alinement with the objective. The objective may then be accurately focused on the screen by looking into the focusing device and moving the objective forwardly and rearwardly until the image appears sharp on the ground glass. At this time the mats of the view finder may be adjusted to correspond with the field of view of the camera lens, and the finder may be alined with the scene. The finder, indicated generally at 25, is carried at the side of the camera outside of focusing device 20, as on a bracket 23, and this bracket may have provision for swinging the finder in a horizontal plane, as on a pivot 24, to aline the finder with the scene, or in other words to adjust for parallax. A present preferred view finder mounting, indicated in the drawings, is disclosed and claimed in my application entitled Swinging finder mounting, Ser. No. 693,738, filed Oct. 16, 1933, which has matured into U. S. Patent 2,012,-514, issued August 27, 1935. After the camera objective is focused and the finder is adjusted, the camera box is returned to its initial position to bring the aperture plate and film back into alinement with the objective. When this is accomplished, the same field of view then spread on the film is framed within the view finder.

The view finder proper comprises a casing forming a light conduit and made up of vertical side walls 26 and 27 and top and bottom walls 28 and 29, respectively, the casing being rectangular in cross-section (see Fig. 5). The forward end of the finder body is comprised of a mounting casting 30, which has the pivot mounting 24 heretofore referred to, and carries the finder objective combination 31. This objective combination is preferably an erecting combination giving an image which is right side up and correct as for right and left, such a combination being described in my patent No. Re. 17,995, entitled "Erecting finder." Means for automatically focusing said combination, if desired, may be such as disclosed in the application referred to above Ser. No. 693,738, which has matured into U. S. Patent 2,012,514, issued August 27, 1935. The upper and lower walls of casting 30 and the finder body are parallel, while the side walls thereof diverge rearwardly from the objective combination to a point 32 somewhat to the rear of the center of the finder body, and then extend parallel to each other to the rear end of the finder (see Fig. 3). The walls 26, 27, 28, and 29 of the finder casing fit over a reduced extension 34 of mounting casting 30 so as to be flush with the outer surface thereof, and are fastened to said casting as by screws 35. The top and bottom finder casing walls 28 and 29 are formed along their longitudinal edges with flanges 36 adapted to fit over side walls 26 and 27, and screws 37 fasten said flanges to walls 26 and 27.

Mounted to the rear of the objective combination in the divergent section of the corresponding casing, and located properly with respect to the focal plane of the objective combination, is a glass 40 having a suitable image receiving surface 41 on its forward side, surface 41 being at the focal plane of the objective. This image receiving surface 41 may, for instance, be a ground glass surface. Glass 40, which is rectangular in configuration, is preferably a planoconvex lens, its forward plane surface being ground as mentioned, and its rearward surface being slightly convex so that the lens acts as a light collector. It may here be stated that, in the present form of the invention, the framing of the field of view in the view finder is accomplished directly in front of ground glass surface 41, as will be more fully described hereinafter. To the rear of lens 40 may be another collecting lens 43, as shown in Fig. 3.

Figure 6:
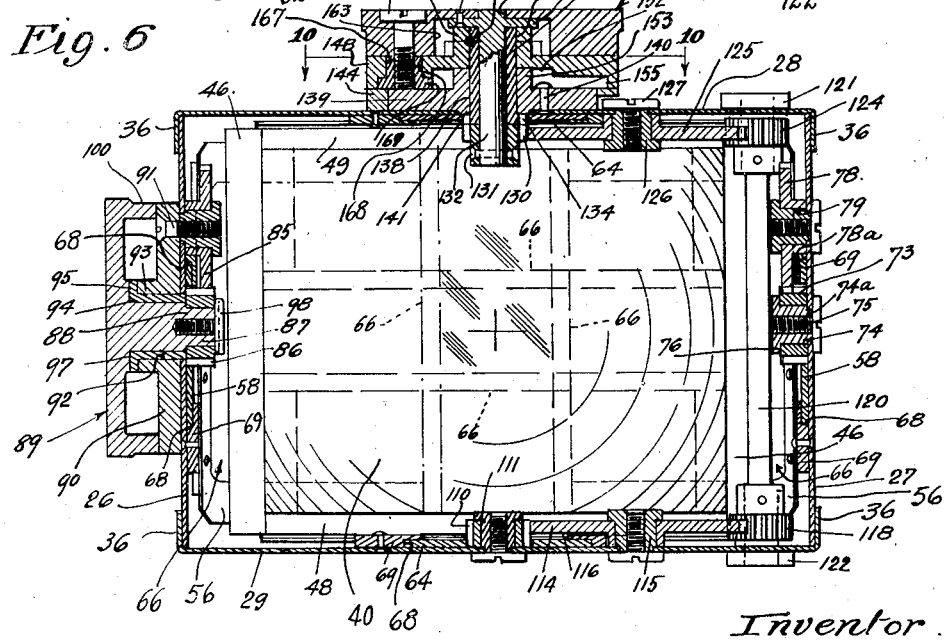
Fig. 6 is a transverse section taken as indicated by broken line 6—6 of Fig. 3.

Lens 40 is mounted in a frame 45 comprising upright members 46 having grooves 47 within which the vertical edges of the lens are received (Fig. 3), a horizontal lower member 48 supporting the lower edge of the lens and secured, as by welding, between the lower ends of members 46, and a horizontally extending upper member 49 which may be frictionally held between the upper ends of members 46. Upright members 46, which are slightly spaced from the side walls of the casing to provide for passage of the later described mats (Figs. 3 and 6), are secured top and bottom at their forwardly facing surfaces 50 to upper and lower horizontal members 51 and 52, respectively, the ends of said members 51 and 52 engaging the side walls 26 and 27 of the casing and being secured thereto as by screws 54. The upper and lower surfaces of members 51 and 52, respectively, engage the inner surfaces of the casing walls, while the upper and lower horizontal lens frame members 49 and 48, respectively, are spaced slightly from the casing walls to provide for the later described mats, as are the upright frame members 46, all as clearly shown in Figs. 3 and 4.

The inwardly facing surfaces of horizontal members 51 and 52, respectively, are formed with opposed grooves 55 providing a horizontal way for a pair of flexible, rectangular, side mats 56. These side mats, which may be of thin flexible metal, or any other suitable flexible material, curve from the ends of grooves 55 around the outer edges of uprights 46 and extend rearwardly outside said uprights along the inner surfaces of casing side walls 26 and 27, as clearly shown in Fig. 3. The mats are individually operable to slide in grooves or ways 50 for the purpose of adjusting the side or vertical edges of the field of view in front of the ground glass by forward or rearward movement of rearwardly extending slide members or plates 58 affixed thereto, as by rivets 59.

The inwardly facing surfaces of upright frame members 46 are formed just forwardly of lens 40, with grooves 60 providing a vertical way for flexible upper and lower mats 61 and 62, respectively, it being noted that said grooves 60 are in a plane back of the side mats, so that the upper and lower mats may overlap the side mats. These upper and lower mats, which may be substantially of the same nature as the side mats, curve from the ends of grooves 60 around the outer edges of horizontal upper and lower frame members 49 and 48, respectively, and extend rearwardly along the inner surfaces of the respective upper and lower walls of the casing, their rearward ends being affixed, as by rivets 63, to rearwardly extending slide members or plates 64, which are movable forwardly or rearwardly to cause the mats to slide vertically in grooves 60 for the purpose of framing the horizontal edges of the field of view before the ground glass.

It will now be understood that forward or rearward movement of the rearwardly extending slide members attached to the flexible mat causes the mats to flex and slide around the edges of the lens frame and through the transverse ways in front of the ground glass whereby their straight horizontal and vertical aperture defining edges adjust the field of view at the ground glass. The mats, although flexible, possess sufficient thickness to stand in the position described and to be pushed forward by force applied at their rear edges. The mats preferably are cut out back of the view defining edge, as indicated at 66, leaving simply a narrow mat element or frame to define the view area so that it is possible to observe objects just outside the field of view, or to observe moving action just before it enters the field of view. The advantage of this provision is obvious to the camera operator. It is to be understood that when the claims refer to a mat, such a narrow frame, or mat element, is contemplated as within the meaning of that expression.

Means now to be described are provided for interconnecting opposing mats to move in unison, and for operating each such pair of interconnected mats by a single operating means. There is utilized for each mat moving slide plate a gear meshing with rack teeth on said plate and operable in unison with the corresponding gear of the opposing mat. Thus the slide plates, which slide in ways 68 provided by guide strips 69 (see Figs. 3, 4, 5, and 6), are each provided with a longitudinally extending slot 70 having along one of its longitudinal edges rack teeth 71, as clearly shown in Figs. 3 and 4.

Considering first the side mat 56 that moves adjacent the casing side wall 27, which side wall is next to the camera, there is seen to be a gear 73 meshing with the rack teeth of the slider plate connected to said mat, and said gear is rotatable on a bearing bushing 74 mounted on the inner surface of casing side wall 27 by means of a screw 75 passing through said wall and screw threaded into the bushing, which bushing has a reduced end 74a set into the casing wall. Bushing 74 has a flange 76 confining gear 73 thereon. Gear 73 meshes with a larger gear 78 directly above it which is rotatable in a similar manner on a bearing bushing 79 mounted on casing side wall 27. Gear 78 is formed at 78a to clear guide strip 69 and slide plate 58.

Above and slightly rearward of gear 78 is a smaller gear 80 meshing therewith, said gear 80 just clearing upper casing wall 28 as shown in Fig. 4. Gear 80 is mounted on a horizontal shaft 81 extending across the view finder casing adjacent upper casing wall 28 and mounted at its ends in suitable bearings 82 carried by the casing side walls (see Fig. 9). Said shaft 81 is between the upper limit of the largest view area to be framed within the device and upper casing wall 28, and accordingly does not interfere with the view area of the light conduit.

On the opposite end of shaft 81, adjacent the inner surface of casing side wall 26, is a gear 84 similar to gear 80, and gear 84 meshes with a gear 85 mounted on wall 26 directly across from and similarly mounted to the aforementioned gear 78 on opposite side wall 27. Gear 85 meshes with a gear 86, similar to and directly across from the aforementioned gear 73, gear 86 being mounted fast on the inner reduced end 87 of the center shaft 88 of side mat operating knob 89.

Gear 86 meshes with the rack teeth 71 of the mat operating slide plate 58 that moves adjacent side wall 26, and it will be evident that the gear train described interconnects the two side mat operating slide plates and thus constrains the opposing side mats to move in unison toward and from each other.

A mounting disc 90 for knob 89 is mounted adjacent the outer surface of side wall 26 and is fastened thereto by screw 91, said screw 91 serving also as a mounting for the bearing bushing on which gear 85 is mounted. Mounting disc 90 has an axial bore 92 and an outwardly extending annular flange 93 defining said bore. A bushing 94 having an external flange 95 adapted to engage the end of flange 93 is force fitted within bore 92 and extends through casing wall 26, as shown, the engagement of bushing flange 95 with flange 93 accurately positioning the bushing. The center shaft 88 of knob 89 has a free turning fit within the bore of bushing 94, and knob 89 has an annular bearing surface 97 which engages and rotates on the outer end of bushing 94. Gear 86 is fastened on the reduced inner end 87 of center shaft 88 by flat headed screw 98, and gear 86 engages the inner end of bushing 94 to confine the knob in axial position.

Knob 89 has an outer knurled or milled rim portion 99 for convenience in gripping, and adjacent said milled portion has a flange 100 of slightly reduced diameter which comes against and rotates on the outer surface of mounting disc 90, the outer periphery of said flange 100 being of the same diameter as disc 90. Disc 90 is formed with an indicating mark 102 (see Fig. 5), and the outer peripheral surface of knob portion 100 is inscribed with a suitably calibrated scale, reading for instance in focal lengths of camera objectives.

It will be understood that manual rotation of knob 89 acts through the described gearing to move the two side mats back and forth in unison, and that knob 89 accordingly constitutes a single operating means for the two opposed side mats. To adjust the two vertical edges of the field of view framed within the view finder to correspond with that spread on the film by a camera objective of given focal length, it is only necessary to rotate the side mat controlling knob to the proper position for that focal length lens, as indicated by the scale inscribed on the knob.

The proper initial setting of the two side mats relative to each other can be accomplished by adjusting the gear relations as the parts are originally assembled and before top casing wall 28 has been put in place. Likewise, the proper setting of the calibrated knob 89 relative to the two mats can be adjusted by rotating the knob relative to gear 86 before screw 98 is set up.

The rack teeth 71 of the slider plate 64 connected to the lower mat are engaged by a gear 110, which is rotatable on a bearing bushing 111 (similar to previously described bushing 74) mounted on lower casing wall 29. This gear 110 meshes with a larger gear 114 mounted to one side thereof on a bearing bushing 115 similarly mounted on wall 29, gear 114 being formed at 116 to clear guide strip 69 and slider plate 64. Gear 114 meshes with a smaller gear 118 mounted close to side wall 27, gear 118 being on the lower end of a vertical shaft 120 journaled at its upper and lower ends in suitable bearings 121 and 122 mounted on upper and lower casing walls 28 and 29, respectively. This shaft 120 is disposed between the outer limit of the largest view area to be framed within the instrument and the adjacent casing side wall 27, so that the view area of the light conduit is not interfered with by the presence of the shaft. On the upper end of the shaft, just below upper casing wall 28, is a gear 124 similar to gear 118 and gear 124 meshes with a larger gear 125 directly opposite and similar to the aforementioned gear 114, said gear 125 being mounted on a bearing bushing 126 fastened in place in upper casing wall 28 by flat headed screw 127.

Gear 125 meshes with a gear 130 fastened, as by rivet 131, on the lower end of an operating knob center shaft 132 that extends downwardly through an opening in casing top wall 28. Surrounding shaft 132 is a gear sleeve 133 having on its lower end, adjacent gear 130, a gear 134 of the same diameter as gear 130. Said gear 134 meshes with the rack teeth 71 on the upper mat slider plate 64. Gear 130 on shaft 132 is capable of being rotatably adjusted with reference to gear 134 on sleeve 133, but during operation gears 130 and 134 are locked securely together, as later to be described.

Gear sleeve 133 is mounted to rotate in the axial bore 138 of a mounting disc 139 mounted on the upper surface of casing wall 28 and fastened thereto as by rivet 140. The lower side of disc 139 has a coaxial boss 141 which extends through casing wall 28 and is flush with the inner surface thereof. A ring 144 of the thickness of disc 139 is relatively rotatable on the periphery of said disc, and means are provided for fastening ring 144 to the disc after proper rotatable adjustment thereon. For instance, ring 144 may be provided with circumferential slots 145 through which pass clamping screws 146 which screw thread into the periphery of disc 139, their heads engaging ring 144 (see Fig. 5). The purpose of this adjustment will appear hereinafter.

A circular plate 148 of the diameter of ring 144 is mounted for rotation on the upper side of said ring. This plate 148 has a central upwardly extending boss 149 and an axial bore 150 through which extends the upper end of gear sleeve 133, said plate and gear sleeve being fastened rigidly together as by means of pin 151. The lower side of plate 148 has a counter bore 152 within which is taken an upwardly extending boss 153 of the aforementioned disc 139, plate 148 having bearing on the upper end of said boss. The under side of plate 148 also has a larger counter bore 155 to accommodate certain parts to be described later. Thus gear sleeve 133 and plate 148 are rigid with one another and are supported on disc 139 and ring 144.

Knob center shaft 132 has near its upper end an annular flange 160 which rests on the upper end of gear sleeve 133 and boss 149. Mounted on the upper end of shaft 132 is an operating knob 162, which is counterbored at 163 to receive boss 149 and center shaft flange 160, and has bore 164 through which extends the upper extremity of shaft 132. The knob is fastened to shaft flange 160 as by rivet 165.

The underside of knob 162 comes against the upper side of plate 148, but these parts are rotatably adjustable with reference to each other. An adjustment screw 166 whose head is countersunk in the upper surface of knob 162 extends downwardly and screwthreads into a flanged bushing 167 mounted in an arcuate slot 168 in circular plate 148 (see Fig. 10), the lower end of said bushing having flange 169 of a diameter greater than the width of slot 168 and which engages the underside of plate 148 at the edges of said slot. It will be evident that when screw 166 has been loosened knob 162 may be rotated relatively to plate 148, within the limits set by the length of slot 168, and by tightening screw 166 knob 162 is securely locked to plate 148. It is this adjustment that enables proper setting of the angular relation between gear 130 which is rigid with the knob and the gear 134 that engages the rack teeth of the upper mat slider plate. With the several adjustments all properly made, and with screw 166 tightened, rotation of knob 162 then rotates gears 134 and 130 in unison, and so operates the upper mat directly through the slider plate engaged by gear 134 and the lower mat through gear 130 and the described gear train between gear 130 and the slider plate connected to the lower mat.

The construction described enables relative adjustment of the upper and lower mats for the purpose of centralizing the opening therebetween, either for the purpose of initial adjustment, or in the event the finder should become sprung out of position in a vertical position. To make such an adjustment, the screw 166 that fastens knob 162 to plate 148 (and thus locks gears 130 and 134 together) is loosened, and the knob 162 is then rotated relative to plate 148 until the inner view defining edges of the upper and lower mats are observed to be at equal distances from the horizontal cross-hair. When this adjustment is correct screw 166 is set up.

The calibrated scale for upper and lower mats is inscribed in focal lengths of camera lenses on the outer periphery of circular plate 148 and an indicating mark 171 is inscribed on the adjustable ring 144, as clearly shown in Fig. 5. To coordinate the vertical distance between the inner view defining edges of the upper and lower mats with this calibrated scale reading as indicated by mark 171, screws 146 are loosened and ring 144 rotated sufficiently to make the adjustment.

With the several initial permanent adjustments properly made, the four view finder mats are adjusted to the proper view area for any focal length lens to be used in the camera simply by turning the two mat operating knobs to the proper positions as indicated by their calibrated scales.

It will be understood the drawings and description are merely illustrative of and not restrictive on the broader claims appended hereto, for various changes in design, structure and arrangement may be made without departing from the spirit and scope of said claims.

I claim:

1. In an optical device having longitudinally extending casing walls defining a light conduit of rectangular cross section in which an image is formed in a focal plane transverse of the casing, four flexible mats, means for guiding said flexible mats in said focal plane and in planes along the walls of said casing, one along each wall, separate gear trains mounted on the casing walls interconnecting the two mats moving along each pair of opposite casing walls to move in unison toward and from each other in said focal plane, said gear trains being disposed between the outer limits of the image area framed at the focal plane and the casing walls so as not to interfere with the view area of the light conduit, and a manual operating means for each of said gear trains.

2. In an optical device having longitudinally extending casing walls defining a light conduit of rectangular cross section in which an image is formed in a focal plane transverse of the casing, four flexible mats, means for guiding said flexible mats in said focal plane and in planes along the walls of said casing, one along each wall, separate gear trains mounted on the casing walls interconnecting the two mats moving along each pair of opposite casing walls to move in unison toward and from each other in said focal plane, said gear trains each including a shaft extending across the casing interior outside the limits of the light conduit view area for transmitting gear train motion between mats moving along opposite casing walls, and a manual operating means for each of said gear trains.

3. In an optical device having longitudinally extending casing walls defining a light conduit of rectangular cross section in which an image is formed in a focal plane transverse of the casing, four flexible mats, means for guiding said flexible mats in said focal plane and in planes along the walls of said casing, one along each wall, slide members in the last mentioned planes operatively connected to the mat portions in said planes, rack gear teeth on each of said slide members, a pinion gear supported on each of the casing walls meshing with the rack teeth on the corresponding slide member, separate sets of gear means operatively interconnecting the pinions on each pair of opposite casing walls, whereby the mats moving along opposite casing walls move in unison toward and from each other across the focal plane, and manual means for independently operating each of said sets of gear means and pair of mats connected thereto.

4. In an optical device having longitudinally extending casing walls defining a light conduit of rectangular cross section in which an image is formed in a focal plane transverse of the casing, four flexible mats, means for guiding said flexible mats in said focal plane and in planes along the walls of said casing, one along each wall, slide members in the last mentioned planes operatively connected to the mat portions in said planes, rack gear teeth on each of said slide members, a pinion gear supported on each of the casing walls meshing with the rack teeth on the corresponding slide member, separate sets of gear means operatively interconnecting the pinions on each pair of opposite casing walls, whereby the mats moving along opposite casing walls move in unison toward and from each other across the focal plane, and an operating knob for each of the two interconnected pairs of pinions mounted on the casing and arranged to operate one pinion of each pair.

5. In an optical device having longitudinally extending casing walls defining a light conduit of rectangular cross section in which an image is formed in a focal plane transverse of the casing, four flexible mats, means for guiding said flexible mats in said focal plane and in planes along the walls of said casing, one along each wall, slide members in the last mentioned planes operatively connected to the mat portions in said planes, rack gear teeth on each of said slide members, a pinion gear supported on each of the casing walls meshing with the rack teeth on the corresponding slide member, two shafts extending across the casing interior in directions at right angles to each other and journalled at their ends in the casing walls, said shafts disposed outside the limits of the view area of the casing, a pinion gear on each end of each of said shafts adjacent the inner surface of the corresponding casing wall and geared to the rack operating pinion gear on that wall, the gearing being so arranged that the mats moving along opposite side walls move in unison toward and from each other across the focal plane, and a single manual member for independently operating each pair of gear interconnected mats.

6. In an optical device having longitudinally extending casing walls defining a light conduit of rectangular cross section in which an image is formed in a focal plane transverse of the casing, a pair of flexible mats, means for guiding said flexible mats in planes along opposite side walls of said casing and in said focal plane, the inner ends of said mats defining opposite edges of the view area at said focal plane, slide members in the first mentioned planes operably connected to the mat portions in said planes, rack gear teeth on each of said slide members, a pair of pinion gears, one meshing with the rack teeth on each of said slide members, bearing means supporting one of said pinion gears on the casing wall, an operating knob having a center shaft extending inwardly through and supported by the opposite casing wall and having rigidly mounted on its inner end the other of said pinion gears, and a gear train interconnecting said pinions to cause said slide members and mats to operate in unison.

7. In an optical device having longitudinally extending casing walls defining a light conduit of rectangular cross section in which an image is formed in a focal plane transverse of the casing, a pair of flexible mats, means for guiding said flexible mats in planes along opposite side walls of said casing and in said focal plane, the inner ends of said mats defining opposite edges of the view area at said focal plane, slide members in the first mentioned planes operably connected to the mat portions in said planes, rack gear teeth on each of said slide members, a pair of pinion gears, one meshing with the rack teeth on each of said slide members, bearing means supporting one of said pinion gears on the adjacent casing wall, an operating knob having a center shaft extending inwardly through the opposite casing wall and extending through the other of said pinion gears, said shaft being relatively rotatable within its surrounding pinion gear, a sleeve rotatably mounted on said knob center shaft and made rigid with said last mentioned pinion gear, means for locking said sleeve in adjusted rotative position relative to said shaft, a pinion gear rigidly mounted on the inner end of said knob center shaft, and a gear train interconnecting the pinion gear on said knob center shaft and the pinion gear on the opposite casing wall to cause said slide members and mats to operate in unison.

8. In an optical device having longitudinally extending casing walls defining a light conduit of rectangular cross section in which an image is formed in a focal plane transverse of the casing, a pair of flexible mats, means for guiding said flexible mats in planes along opposite side walls of said casing and in said focal plane, the inner ends of said mats defining opposite edges of the view area at said focal plane, slide members in the first mentioned planes operably connected to the mat portions in said planes, rack gear teeth on each of said slide members, a pair of pinion gears, one meshing with the rack teeth on each of said slide members, bearing means supporting one of said pinion gears on the adjacent casing wall, an operating knob having a center shaft extending inwardly through the opposite casing wall concentric with the other of said pinion gears, a sleeve relatively rotatable on said center shaft, means on the knob for locking said sleeve in adjusted rotative position relative to said shaft, another pinion gear concentric with the last mentioned pinion gear, the last two mentioned pinion gears being fast one on the knob center shaft and the other on the surrounding sleeve, and a gear train interconnecting that one of the two last mentioned concentric pinion gears that does not mesh with the rack teeth of the slider plate, with the pinion gear on the opposite casing wall to cause said slide members and mats to operate in unison.

9. In an optical device having a casing defining a light conduit, a pair of mats oppositely movable across the light conduit, a mat operating knob having a center shaft mounted for rotation on the casing, a sleeve relatively rotatable on said center shaft, a plate rigidly mounted on said sleeve adjacent said knob, means for locking said plate to said knob in adjusted rotative positions relative to one another, a pair of concentric pinion gears mounted one on the sleeve and one on the center shaft, and gear means interconnecting said gears respectively with the two mats to move said mats in opposite directions as the knob is rotated.

10. In an optical device having a casing defining a light conduit, a pair of mats oppositely movable across the light conduit, a mat operating knob having a center shaft mounted for rotation on the casing, a sleeve relatively rotatable on said center shaft, a clamping plate rigidly mounted on said sleeve adjacent said knob, an arcuate slot in said plate, a clamping screw extending through said knob and arcuate slot, a nut member on the lower end of said screw adapted to bear on said clamping plate, a pair of concentric pinion gears mounted one on the sleeve and one on the center shaft, and gear means interconnecting said gears respectively with the two mats to move said mats in opposite directions as the knob is rotated.

11. In an optical device having a casing defining a light conduit, a pair of mats oppositely movable across the light conduit, a mat operating knob having a center shaft mounted for rotation on the casing, a sleeve relatively rotatable on said center shaft, a circular plate rigidly mounted on said sleeve adjacent said knob, means for locking said plate to said knob in adjusted rotative positions relative to each other, a calibrated scale inscribed on the periphery of said circular plate, a member adapted to be mounted independently of the knob adjacent said circular plate and bearing an indicating mark adjacent said scale, said member being circularly adjustable with reference to said circular plate, a pair of concentric pinion gears mounted one on the sleeve and one on the center shaft, and gear means interconnecting said gears respectively with the two mats to move said mats in opposite directions as the knob is rotated.

12. In an optical device having a casing defining a light conduit, a pair of mats oppositely movable across the light conduit, a mat operating knob having a center shaft mounted for rotation on the casing, a sleeve relatively rotatable on said center shaft, a circular plate rigidly mounted on said sleeve adjacent said knob, means for locking said plate to said knob in adjusted rotative positions relative to each other, a calibrated scale inscribed on the periphery of said circular plate, a circular mounting disk of diameter less than said plate having an axial bore providing bearing for said sleeve, said disk adapted to be mounted on said casing, a ring rotatable on the periphery of said disk adjacent said circular plate and bearing an indicating mark adjacent said scale, means for setting said ring relative to said disk, a pair of concentric pinion gears mounted one on the sleeve and one on the center shaft, and gear means interconnecting said gears respectively with the two mats to move said mats in opposite directions as the knob is rotated.

13. In an optical device having longitudinally extending casing walls defining a light conduit of rectangular cross section in which an image is formed in a focal plane transverse of the casing, a pair of mats oppositely movable across said light conduit at said focal plane, a pair of racks for operating said mats to move in opposite directions, a pair of pinion gears, one meshing with each of said racks, bearing means supporting one of said pinion gears on the adjacent casing wall, an operating knob having a center shaft extending inwardly through the opposite casing wall and extending through the other of said pinion gears, said shaft being relatively rotatable within its surrounding pinion gear, a sleeve rotatably mounted on said knob center shaft and made rigid with said last mentioned pinion gear, means for locking said sleeve in adjusted rotative position relative to said shaft, a pinion gear rigidly mounted on the inner end of said knob center shaft, and a gear train interconnecting the pinion gear on said knob center shaft and the pinion gear on the opposite casing wall in such manner that the mats will move to and from each other.

14. In an optical device having longitudinally extending casing walls defining a light conduit of rectangular cross section in which an image is formed in a focal plane transverse of the casing, a pair of mats oppositely movable across said light conduit at said focal plane, a pair of racks for operating said mats to move in opposite directions, a pair of pinion gears, one meshing with each of said racks, bearing means supporting one of said pinion gears on the adjacent casing wall, an operating knob having a center shaft extending inwardly through the opposite casing wall concentric with the other of said pinion gears, a sleeve relatively rotatable on said center shaft, means on the knob for locking said sleeve in adjusted rotative position relative to said shaft, another pinion gear concentric with the last mentioned pinion gear, the last two mentioned pinion gears being fast one on the knob center shaft and the other on the surrounding sleeve, and a gear train interconnecting that one of the two last mentioned concentric pinion gears that does not mesh with the rack, with the pinion gear on the opposite casing wall, in such manner that the mats will move to and from each other.

15. In an optical device having longitudinally extending casing walls defining a light conduit in which an image is formed in a focal plane transverse of the casing, a pair of mats oppositely movable across said light conduit at said focal plane, an operating knob outside one casing wall having a center shaft extending inwardly through said casing wall and a sleeve rotatably mounted on said center shaft and also extending through said casing wall, means for locking said sleeve in adjusted rotative position relative to the center shaft, a pair of concentric pinion gears disposed adjacent to one another inside said casing wall and mounted one on the knob center shaft and one on the surrounding sleeve, and a pair of racks, one operated by each of said pinion gears, said racks being connected each to one of the mats and moved by unitary operation of the respective pinion gears as the knob is turned to move the mats in opposite directions.

GEORGE A. MITCHELL.